T. BOARDMAN.
Harness.
No. 200,243. Patented Feb. 12, 1878.
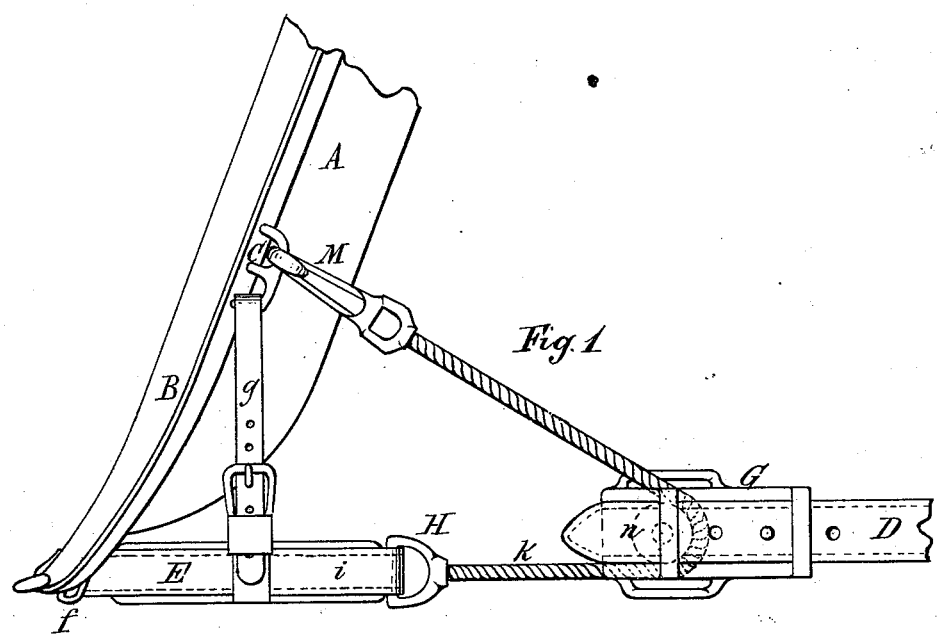
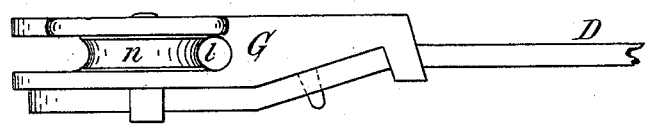

UNITED STATES PATENT OFFICE.

THERON BOARDMAN, OF GRAY, NEW YORK.

IMPROVEMENT IN HARNESS.

Specification forming part of Letters Patent No. 200,243, dated February 12, 1878; application filed December 5, 1877.

*To all whom it may concern:*

Be it known that I, THERON BOARDMAN, of Gray, in the county of Herkimer and State of New York, have invented a new and useful Improvement in Harness, of which the following is a specification, reference being had to the accompanying drawings.

My invention relates to harness for horses and other draft-animals employed in drawing heavy loads, such as canal-boats, &c.; and it has for its object to relieve the shoulders of the animal from excessive pressure and friction, thereby preventing the same from becoming galled.

My invention consists in combining in the same harness a hame-collar and a breast-collar, and connecting both with the tug or trace, in such manner that the strain or pull of the trace is distributed upon the hame-collar and breast-collar, as will be hereinafter fully set forth.

In the accompanying drawings, Figure 1 is an elevation of my improved harness. Fig. 2 is a top-plan view of the trace-buckle.

Like letters of reference designate like parts in each of the figures.

A represents the ordinary collar; B, the hame; C, the hame-staple, preferably made with two loops or openings; D, the tug or trace, and E the breast-collar. The latter is preferably made in two parts, connected at the front by a buckle, $f$. $g$ is a strap connecting the breast-collar E with the lower loop of the hame-staple C, for supporting the breast-collar at the proper height. G is the trace-buckle, to which the forward end of the trace is connected. H is a metallic piece attached to the rear end of the breast-collar E, so as to be capable of lateral play in the strap $i$ of the breast-collar. $k$ is a strap, cord, or rope, preferably a wire-rope, secured with one end to the metallic piece H, and running through an opening, $l$, in the forward part of the trace-buckle G, and carrying at its opposite end a snap-hook or other fastening, M, by which the rope $k$ is connected with the hame-staple C. The trace-buckle G is preferably constructed with a bifurcated body, containing a roller, $n$, against which the rope $k$ bears, and which permits the rope to adjust itself freely as the relative position of the parts is changed by the motion of the draft-animal or from other causes.

The strain of the tug or trace D is applied by the rope $k$, partly upon the hame B and partly upon the breast-collar E, thereby avoiding excessive pressure and friction upon the shoulders of the animal, and preventing the same from becoming sore or galled, while at the same time enabling the animal to perform its work with greater ease.

I claim as my invention—

1. The combination, with the collar and hame A B and trace D, of the breast-collar E and strap or rope $k$, connecting the breast-collar and hame-collar with the trace, substantially as shown and described, and for the purpose set forth.

2. The combination, with the collar and hame A B, provided with staple C and the trace D, of the breast-collar E, rope $k$, secured thereto and provided with snap-hook M, and trace-buckle G, having a roller, $n$, substantially as and for the purpose set forth.

THERON BOARDMAN.

Witnesses:
EDWARD WILHELM,
CHAS. J. BUCHHEIT.